Patented June 2, 1953

2,640,786

UNITED STATES PATENT OFFICE 2,640,786

COATING COMPOSITION AND FIRE RESISTANT BUILDING ELEMENT COATED THEREWITH

Joseph R. Parsons, Chicago, Ill., Morton C. Higgs, Bell, Calif., and Mary A. Loos, Chicago, Ill., assignors to United States Gypsum Company, Chicago, Ill., a corporation of Illinois No Drawing. Application July 8, 1948, Serial No. 37,536

10 Claims. (Cl. 106—282)

This invention relates to roofing and siding materials and coating compositions suitable for use in preparing building materials of this type. More particularly, this invention relates to coating compositions and roofing and siding material prepared therefrom which have greatly enhanced fire resistance.

For many years wood shingles were widely used as roofing materials. The widely recognized disadvantage of wood shingles, however, is their extreme flammability. Their extensive use continued for a number of years, however, since slate and tile, the only fire-resistant shingles on the market in early times, were expensive and very heavy. A number of years ago, however, the so-called composition shingles were introduced to the market. These are prepared by impregnating a suitable felt with a bituminous saturant, applying to one surface of the saturated felt a coating of asphalt which may or may not have an added mineral filler, and thereafter embedding mineral granules in the asphalt coating. With the introduction of composition shingles of this character, the use of wood shingles has rapidly diminished and, in fact, today wood shingles are prohibited by ordinance in many cities. The above-referred-to composition shingles are today competitive with wood shingles in cost and offer very definite advantages in fire protection over wood shingles. It has been appreciated, however, that prior art composition shingles of this general character, despite the superiority to wood, have only a limited resistance to fire.

A rating system has been devised by Underwriters' Laboratories, Inc., to classify various roofing materials as to fire resistance when laid under conditions simulating actual use in the field for the particular roofing material being tested. This rating system and test methods employed are set forth in Underwriters' Laboratories Subject 55 dated August 7, 1945. This devised system comprises flame exposure tests, spread of flame tests and burning brand tests. The classification given a roof covering upon being subjected to these tests depends not only upon the manner in which the covering is applied to the roof and the nature of the roof support, but also upon the nature of the roofing material itself. Wood shingles when laid in courses on a roof will ordinarily receive no rating whatsoever in the test system devised, while the usual prior art composition asphalt shingles when laid in the customary manner will generally rate in class C. It is recognized in the roofing art that it is desirable to provide roof coverings having increased fire resistance which, when applied, will have a rating higher than class C, that is, class B or even class A.

Accordingly, it is one object of this invention to prepare a bituminous coating material having enhanced fire-resistant qualities when tested under comparable conditions with prior art material of the same general character.

It is a further object of this invention to prepare asphalt-coated roofing capable of qualifying for at least a class B rating when tested in accordance with the methods devised by Underwriters' Laboratories, Inc.

It is a still further object of this invention to prepare fire-resistant, weather-resistant covering material by a cheap and simple process from readily available substances.

A still further object of this invention is the provision of a coating composition which is particularly adaptable for use on roofs and in the preparation of fire-resistant shingles and siding.

A still further object of this invention is the provision of a process for preparing fire-retardant coating compositions and roofing and siding of the character indicated above.

An additional object of this invention is to provide a bituminous composition characterized by enhanced fire resistance, ease of application and stability over long periods of time to weathering conditions on all types of roof constructions and particularly on roof coverings formed on the job known as built-up roofs.

Further and additional objects of this invention will be apparent from the following description and the appended claims.

It has been discovered in accordance with this invention that a coating composition having improved fire-retardant and weather-resistive qualities may be prepared which comprises a mixture of a binder (such as asphalt, tar, pitch or other bituminous materials) and pellets of mineral fibers (such as mineral wool fibers). When a coating composition of this character is prepared and applied to a suitable base material as hereinafter described, there results a covering which has enhanced fire-retardant qualities and will receive a higher Underwriters' Laboratories test rating than prior art coverings prepared from bituminous materials, such as asphalt and the like, and conventional fillers.

In carrying out this invention in one form, a fire-retardant coating composition is prepared by melting an asphalt and admixing with the resulting melt preformed pellets of mineral wool which may be obtained from any desired source. The proportion of asphalt binder to the mineral pellets is adjusted so that the heated asphalt-pellet mixture may be evenly spread and/or extruded over a suitable base material, such as asphalt-impregnated felt formed from paper, rags, asbestos, mineral wool, etc., or a fibrous insulation board, in accordance with the usual practice. After the coating composition containing the mineral wool pellets has been applied to the base sheet, mineral granules, gravel or other protective and decorative materials may be imbedded directly in the exposed surface of the coating and the coating is then hardened by cooling. After hardening, the resulting product will have greatly enhanced fire-resistant qualities when tested under identical conditions and compared with a similar product coated with asphalt but which contains no added mineral wool pellets.

The presence of the formed pellets in the coating composition constitutes an important feature of this invention. When the coating composition containing the pellets is subjected to fire, the asphalt becomes fluid and for some unknown reason the pellets expand or puff up. It is believed that the resulting puffed-up, skeletal, felt-like arrangement of fibers within the heated fluid coating is responsible for the enhanced fire resistance of the composition. The action also has a tendency to prevent the flow of hot binder along the sheet when subjected to fire conditions. Even when the bituminous binder is destroyed by fire, the puffed-up, skeletal, felt-like layer remains further to protect the base.

In the preparation of the coating composition and the roofing of this invention, it is usually preferable to incorporate additional mineral fibers, such as asbestos, along with the mineral wool pellets into the binder, though satisfactory results can be obtained through the sole use of the pellets and suitable binder. These additional fibers may constitute a part of the fiber pellets or may be introduced into the binder separately to form separate discrete fibers in the coating along with the pelleted fibers. When asbestos fibers are employed as a supplement, they preferably should have a fineness modulus of about 2 or above, as will be hereinafter more fully defined. Also, in the preparation of the coating composition suitable for a fire-retardant composition sheet contemplated by this invention, it is preferred to add a filler to the asphalt along with the mineral wool pellets and supplemental fibrous material if any is used. Such fillers may comprise finely divided particles of an inorganic substance, such as ground limestone, slate flour, clay, barytes, sand, asbestine, or mixtures thereof. If desired, the filler may suitably comprise ground glass beads formed when mineral wool is made.

The binder employed in the coating composition of this invention may be any of the types customarily employed in coatings for conventional compositions used for built-up roofing, composite shingles or roofing material. Asphalt, tar, pitch or other bituminous material are illustrative and typical. The amount of asphalt employed should be sufficient to permit the coating composition to be spread and/or extruded readily when hot over the base sheet material and to result in a weather-resistant coating composition. On the other hand, the relative proportion of asphalt should not be so great as to negative the fire-retardant effect produced by the pellets incorporated therewith. Except in special cases, the proportion of asphalt employed is suitably between about 30 per cent and about 70 per cent of the total weight of the coating, and preferably within the range of 40 to 65 weight per cent. In place of asphalt, other bituminous materials, such as pitches, tars, resinous materials or blends thereof, may be used as the binder.

Though the softening point of the bituminous material or other binder may vary considerably, it is highly desirable that the composition of this invention comprised essentially of the bituminous material and fibrous pellets will have softening points designed for its intended usage. Thus the desirable softening point of the composition of this invention will vary somewhat according to its intended use. For example, if the coating composition is to be used on a steep roof, the softening point of the finished composition should be higher than if used on a flat roof. Also the flowability of the product should be such that it will not run over the surface to which it is applied under fire conditions. The various factors which are important in determining softening points and flowability under fire conditions are the softening point of the binder per se, amount of filler, amount and character of the pellets, granular coating on the product, etc. An asphalt which is suitable for use in the composition of this invention is a blown asphalt having a softening point between about 180° and about 240° F.

In a preferred form of the invention, both mineral wool pellets and asbestos fibers are employed. The asbestos fiber may be added directly to the mineral wool prior to or during pelleting, or the asbestos fibers may be separately incorporated into the coating as discrete fibers. Asbestos fiber shorter than No. 6 is preferably formed into pellets with the mineral wool, while asbestos fiber of grade No. 6 or longer is preferably separately incorporated into the coating.

Thus, in accordance with a preferred form of the invention, the range in proportions of the various ingredients is as follows:

|  | Weight per cent |
|---|---|
| Asphalt | 40 to 65 |
| Asbestos | 0 to 20 |
| Mineral wool pellets | 5 to 25 |
| Mineral filler | Balance (if any required) |

As previously stated, the asbestos fibers employed in conjunction with the mineral wool pellets preferably should have a fineness modulus above about 2. Thus one sample of a 7–R grade asbestos fiber, which is finer than No. 6 grade, was subjected to a standard screen analysis wherein 43.4 per cent was retained on a 14 mesh screen, 27.0 per cent passed through 14 mesh but was retained on 28 mesh, 10.2 per cent passed through a 28 mesh screen but was retained on a 48 mesh, 5.5 per cent passed through a 48 mesh but was retained on a 100 mesh, and 14.6 per cent passed through a 100 mesh. This sample has a fineness modulus of about 2.81. The fineness modulus is computed from the above indicated screen analysis by adding the cumulative total per cents retained on each screen and dividing the total by 100. This is a well known method for classifying asbestos fibers. The grades of asbestos mentioned in the present specification are those set up by the Quebec Asbestos Producers Association. These grades are more fully set forth in the Canadian Department of Mines Bulletin No. 707 (1931), and are also described in the United States Bureau of Mines Bulletin No. 403 on Asbestos (1937) starting on page 70. These designations are fully accepted by the trade and are thoroughly understood by those skilled in the art of dealing with asbestos and asbestos products. In this connection see also column 6 of United States Patent No. 2,569,399 of Burns and Larrison, at lines 11 through 67. Another sample of 7–R grade asbestos from a different source was subjected to an identical screen analysis and was found to have a fineness modulus of 1.66. This latter product was not so satisfactory in producing the fire-retardant composition of this invention as was the asbestos having the fineness modulus of 2.81. Generally speaking, the asbestos fibers employed should have a fineness modulus above about 2. If the fibers are No. 6 grade or longer, they are preferably incorporated separately into the coating composition as suggested above. It is preferred to employ more than about 5 weight per cent of pellets in order to impart the desired fire-retardant qualities. However, the pellets usually should not be present in an amount greater than about 25 weight per cent because of difficulties incident to application of the composition to a base sheet to form a continuous protective coating.

The mineral fiber pellets that are employed in the coating composition of this invention are preferably those that are prepared from mineral wool which may be blown from rock, slag, glass or any ingredients or mixtures thereof commonly employed for making mineral or glass wool. In order to prepare suitable pellets from mineral wool, ordinary mineral wool of commerce is, for example, passed through a hammer mill, whereby the mineral wool is chopped into about one inch pieces. One part by weight of the thus chopped mineral wool is then mixed with at least about two parts by weight of water and the resulting mixture is agitated as by stirring in a suitable mixer. This agitation causes the pieces of mineral wool to form tightly rolled pellets of varying size. The size of pellets formed will depend upon a number of factors, such as speed of agitation, fiber diameter, nature and character of the fibers, type of mixer, etc. A mixing machine has been found satisfactory for the purpose. The mixer may be provided with a 21 inch diameter bowl and a 12 inch wire whip revolving at a rate of 300 R. P. M. The mineral wool fibers suitable for pelleting should be flexible in character and preferably have a diameter less than about 8 microns. After the pellets have been formed, excess water is drained therefrom and the pellets are dried. These pellets may be used directly in the coating composition of this invention. If desired, the asbestos fiber may be pelleted, together with the mineral wool, by adding it to the mineral wool-water slurry near the end of the pelleting cycle. This may be effected by adding about one-half part or more by weight of asbestos fibers, preferably having a fineness modulus greater than about 2 as above defined, but preferably not longer than No. 6 grade, to the mixture of water and mineral wool pellets and continuing the stirring of the resulting slurry for a short period in order that the wool pellets have asbestos fibers incorporated therewith. Thereafter the asbestos fiber-mineral wool pellets are drained and dried and may be incorporated into the binder. The drying of the pellets may in any event be readily effected by tumbling the pellets in a heated chamber or a rotary drier, it being preferable that the pellets be in motion during the drying step. If desired, the dried pelleted wool may be screened or air-separated to remove beads and shot. The foregoing method for preparing the pellets is broadly disclosed and claimed in the copending application of George W. Baker, Serial No. 83,237, filed March 24, 1949 and assigned to the same assignee as this application.

In the event that asbestos fiber is used in association with the mineral wool pellets, as is preferred, then the asbestos fiber may be incorporated into the final coating in either of two ways. It may be separately added to the molten asphalt along with the mineral wool fiber pellets and filler at the time of preparing the coating. This method of addition is preferred when fibers of No. 6 grade or longer as determined by the Quebec standard screen test are used. Or, if desired, the shorter asbestos fibers may be combined with the mineral wool pellets directly, as above indicated, whereby the pellets of combined mineral wool and asbestos are incorporated into the molten asphalt. Such shorter asbestos fibers are preferably sufficiently long to have a fineness modulus above about 2.

For a more complete understanding of this invention, reference will be made to the following specific examples which are intended to be illustrative, but not restrictive, of this present invention.

*Example I*

A coating composition having the following formulation was prepared wherein the proportions indicated are in parts by weight:

| | |
|---|---|
| Asphalt | 50 |
| Ground limestone filler | 35 |
| Asbestos-mineral wool pellets | 15 |
| | 100 |

The asphalt was of the Mid Continent blown variety having a ball and ring softening point of about 210° F., and the ground limestone was the usual powdered limestone that is employed as a filler for asphalt compositions of this general character. The asbestos-mineral wool pellets were prepared by the wet method indicated above wherein asbestos fibers of 7R grade having a fineness modulus of 2.81 were incorporated directly into the mineral wool pellets. The ratio of mineral wool to asbestos was 2 to 1 and the pellets varied in size with the maximum being of a size corresponding to about 6 mesh.

In order to prepare the coating composition, the asphalt was melted and the ground limestone and the asbestos-mineral wool pellets were stirred directly into the molten asphalt in order to obtain a mixture containing filler and pellets uniformly distributed therethroughout. The hot fluid coating was then applied to a base sheet of asphalt-impregnated felt by a doctor roll. The coating while hot was readily spreadable by the doctor roll and was applied in an amount of about 38 pounds per factory square (108 square feet) of the base felt. The hot coating was then covered with a layer of mineral granules which were embedded in the coating by a pressure roll to form on cooling a surfaced composite sheet. The mineral granules served to protect the exposed layer of the coating composition and were bound directly thereto by the binding action of the asphalt. The resulting composite sheet may be cut into shingles or formed into rolls. These coated sheets qualified for at least a class B Underwriters' Laboratories rating with respect to fire resistance when applied to a test structure in coverages comparable to those in use under service conditions.

*Example II*

A coating composition having the following formulation in parts by weight was prepared and applied to an asphalt-impregnated base sheet in the manner indicated in Example I:

| | |
|---|---|
| Asphalt | 60.0 |
| Ground limestone filler | 23.5 |
| Asbestos-mineral wool pellets | 16.5 |
| | 100.0 |

The several ingredients were the same as those specified in Example I, except that the asbestos fibers were a 7-K grade. The composite shingles and coated felts prepared therefrom had markedly enhanced fire-retardant qualities.

*Example III*

A coating composition having the following formulation in parts by weight was prepared:

| | |
|---|---|
| Asphalt | 50 |
| Ground limestone filler | 26 |
| Mineral wool pellets | 14 |
| Asbestos fibers (7K) | 10 |
| | 100 |

The asphalt and filler were the same as those indicated in Example I. The mineral wool pellets were prepared separately by a wet method, as indicated above, without asbestos fibers and the asbestos fibers were separately added to the hot asphalt with the pellets and the filler. The resulting composite sheet, coated in the manner indicated in Example I, had increased fire-resistant qualities. It will be noted that a 7-K grade of asbestos fiber was used in this example.

*Example IV*

A composition which contained no asbestos having the following formula in parts by weight was also prepared:

| | |
|---|---|
| Asphalt | 50 |
| Ground limestone filler | 30 |
| Mineral wool pellets | 20 |
| | 100 |

This composition also exhibited improved fire-retardant qualities, but it is preferred to utilize asbestos fibers as previously indicated.

In the foregoing it has been suggested that pellets prepared by a wet method have been found to be very satisfactory for the preparation of the coating composition. However, if desired, the pellets may also be prepared by any suitable dry method. The size of the mineral wool pellets and their density in pounds per cubic foot (dry basis) may vary widely; however, it is preferred to employ small pellets of varying size, all of which will pass a 6 mesh screen. It is permissible to employ a mixture of pellets substantially all of which will pass a 3 mesh screen but will be retained on a 20 mesh screen.

With respect to the density of the pellets employed, this may vary widely between about 6 and 20 pounds per cubic foot, depending upon the diameter of the wool fibers, fiber length, resiliency of fibers, and the amount of beads or shot in the product. The density is preferably between 10 and 12 pounds per cubic foot on a bead-free basis.

As suggested above, at least a portion of the beads may be screened or air-separated from the pellets and the beads may be ground and employed as at least a part of the filler in the coating composition.

In the foregoing it has been pointed out that the coating composition is preferably applied to any base sheet to prepare roofing or siding elements. The amount of coating so applied may vary between about 20 and about 60 pounds per factory square.

As mentioned above the mix containing the pellets and bituminous binders with or without conventional fillers, such as limestone, mica, etc., may be applied directly to various surfaces and roofs. Its use is particularly effective on so-called flat roofs, where the roofing is built up in several layers of felt with intermediate moppings of asphalt courses. A final gravel covering is generally embedded in the top bituminous plastic or coating layer. The improved composition of this invention can replace any or all layers of the said asphalt or bituminous courses and the finished structure will have the enhanced fire-resistant qualities described hereinabove.

The new coating composition and composite sheet material of this invention have been found to have markedly enhanced fire resistance. The reason for this resistance in products of this character is not clearly understood at the present time. However, it is presently believed that these qualities may be the result of the tendency of the pellets under the influence of high temperature resulting from fire to unroll or expand. The so-expanded pellets of mineral fibers have a tendency to interlock and interfelt with themselves and with the other fibers or mineral matter that may be present in the composition to form a tenacious reinforcement for the coating composition, thus providing an insulating skeleton which projects the combustible surfaces on which the roofing or siding is erected. It will also have a tendency to prevent the hot asphalt of the coating composition from flowing.

While the foregoing constitutes an attempt to explain the phenomenon observed with the coating composition of the invention, it will be understood that the invention is not to be limited by the theories herein advanced to explain the observed beneficial results.

While several particular embodiments of this invention are suggested above, it will be understood, of course, that the invention is not to be limited thereto, since many modifications may be made, and it is contemplated, therefore, by the appended claims, to cover any such modifications as fall within the true spirit and scope of this invention.

We claim:

1. A coating composition applicable to inherently combustible base-sheet material to form therewith a relatively fire-resistant building-covering material comprising a filled thermoplastic bituminous binder containing from about 30% to about 70% by weight of asphalt, from about 10% to about 25% by weight of small tightly rolled up mineral wool masses having a diameter such that they will pass through a 3-mesh screen but be retained on a 20-mesh screen, and enough of an inorganic filler from the group consisting of ground minerals and asbestos to make 100% by weight.

2. A coating composition applicable to inherently combustible base-sheet material to form therewith a relatively fire-resistant building-covering material comprising a filled thermoplastic bituminous binder containing about 50% by weight of asphalt, about 35% by weight of a ground mineral filler, and about 15% by weight of small tightly rolled up masses consisting of a mixture of asbestos fibers and mineral wool in the proportions of about one of the former to two of the latter, said masses being of a size to pass through a 6-mesh screen.

3. A coating composition, applicable to inherently combustible base-sheet material to form therewith a relatively fire-resistant building-covering material comprising a filled thermoplastic bituminous binder containing about 60% by weight of asphalt, about 23.5% of ground limestone filler, and about 16.5% of small tightly rolled up masses of a mixture of asbestos fibers and mineral wool in the proportions of about one of the former to two of the latter, said masses being of a size to pass through a 6-mesh screen.

4. A coating composition applicable to inherently combustible base-sheet material to form therewith a relatively fire-resistant building-covering material comprising a filled thermoplastic bituminous binder containing about 50% by weight of asphalt, about 26% of ground limestone filler, about 10% of asbestos fibers, and about 14% of small tightly rolled up mineral wool masses having a diameter such that they will pass through a 3-mesh screen but be retained on a 20-mesh screen.

5. A coating composition applicable to inherently combustible base-sheet material to form therewith a relatively fire-resistant building-covering material comprising a filled thermoplastic bituminous binder containing about 50% by weight of asphalt, about 30% of ground limestone filler, and about 20% of small tightly rolled up mineral wool masses having a diameter such that they will pass through a 3-mesh screen but be retained on a 20-mesh screen.

6. A building element having water- and fire-resistant qualities, comprising an inherently combustible base-sheet material coated with the composition of claim 1.

7. A building element having water- and fire-resistant qualities, comprising an inherently combustible base-sheet material coated with the composition of claim 2.

8. A building element having water- and fire-resistant qualities, comprising an inherently combustible base-sheet material coated with the composition of claim 3.

9. A building element having water- and fire-resistant qualities, comprising an inherently combustible base-sheet material coated with the composition of claim 4.

10. A building element having water- and fire-resistant qualities, comprising an inherently combustible base-sheet material coated with the composition of claim 5.

JOSEPH R. PARSONS.
MORTON C. HIGGS.
MARY A. LOOS.

References Cited in the file of this patent

UNITED STATES PATENTS

| Number | Name | Date |
|---|---|---|
| 351,611 | Alexander | Oct. 26, 1886 |
| 775,636 | Rugen et al. | Nov. 22, 1904 |
| 1,190,505 | Boardman | July 11, 1916 |
| 1,750,725 | Miller | Mar. 18, 1930 |
| 1,770,767 | Collings et al. | July 15, 1930 |
| 1,850,680 | Levin | Mar. 22, 1932 |
| 2,060,295 | Finefrock et al. | Nov. 10, 1936 |
| 2,157,696 | Greider et al. | May 9, 1939 |
| 2,275,816 | Ericson | Mar. 10, 1942 |
| 2,311,613 | Slayter | Feb. 16, 1943 |
| 2,326,723 | Fasold et al. | Aug. 10, 1943 |
| 2,354,593 | Greider et al. | July 25, 1944 |
| 2,375,284 | Coss | May 8, 1945 |
| 2,424,234 | Greider et al. | July 22, 1947 |
| 2,458,143 | Burns | Jan. 4, 1949 |